Feb. 27, 1962  P. B. ZEIGLER ETAL  3,022,772
ROTARY POWER STEERING VALVE WITH TORSION BAR CENTERING
Filed Sept. 19, 1958  3 Sheets-Sheet 1

INVENTORS
Philip B. Zeigler &
BY William Blair Thompson

Bryce Beecher
ATTORNEY

Feb. 27, 1962     P. B. ZEIGLER ETAL     3,022,772
ROTARY POWER STEERING VALVE WITH TORSION BAR CENTERING
Filed Sept. 19, 1958     3 Sheets-Sheet 2

INVENTORS
Philip B. Zeigler &
BY William Blair Thompson

Bryce Beecher
ATTORNEY

INVENTORS
Philip B. Zeigler &
BY William Blair Thompson
Bryce Beecher
ATTORNEY

United States Patent Office 3,022,772
Patented Feb. 27, 1962

3,022,772
ROTARY POWER STEERING VALVE WITH TORSION BAR CENTERING
Philip B. Zeigler and William Blair Thompson, Saginaw, Mich., assignors to General Motors Corporation, Detroit, Mich., a corporation of Delaware
Filed Sept. 19, 1958, Ser. No. 762,153
12 Claims. (Cl. 121—41)

This application is a continuation-in-part of Serial No. 687,728 filed October 2, 1957 and now abandoned.

The present invention relates to a fluid-operated servo mechanism and its most specific aspect concerns a hydraulic power steering gear of unique construction and operation.

Due to the growing number of accessory devices demanding the use of components which, for economic and other practical reasons, must be located under the engine hood or bonnet in proximity to the engine and due further to body design trends which dictate a low silhouette with a flat hood, the space available in the engine compartment of the present-day automobile is quite restricted. This condition has led to efforts toward reducing the size and changing the shape of such components and the present invention constitutes a step in this direction. Additionally, much effort has been expended toward simplifying the construction, assembly and operation of these components and the associated parts with a view toward reducing costs. Here again the instant invention represents a substantial advance. Thus, it has heretofore been deemed necessary to incorporate in the control valve component of the power steering apparatus means whereby the working pressure is applied as a resistance to displacement of the movable element of the valve to the end of creating an "artificial feel" at the steering wheel. In such prior constructions, the fluid resistance is normally supplemented by the incorporation in the "feel" chamber or chambers of one or more centering springs which require adjustment at assembly and complicate the assembly operation. Where centering springs have been used alone without means providing a fluid resistance to displacement of the valve, the operation of the gear has proven unsatisfactory because at speeds above about 30 m.p.h. the steering is accomplished mechanically without compression of the springs and the transition to power steering as the speed of the vehicle decreases is so abrupt that the operator has the feeling that the steering function is being taken away from him. A feature of the present invention resides in the fact that the need for a feel chamber is dispensed with, yet there is no transition point sensible to the average operator.

The principal objects of the invention are believed clear from the foregoing. Other objects will be apparent from the following description of a preferred embodiment illustrated by the accompanying drawings wherein.

Generally described, the illustrated servo mechanism comprises a fluid motor having the usual output member and a control valve for the motor including a first component operably connected to the motor output member and a second component which moves in correspondence with the input to the servo. The first valve component, as indicated, turns with the motor output member and serves as a pressure pick-up, separating the pressure and return lines, also the power lines or conduits extending to the motor. The fluid travels between annular grooves in the first valve component through radial holes or passages therein to axial passages provided by complementary grooves formed in the two components and which control the direction of fluid flow.

Figure 1:
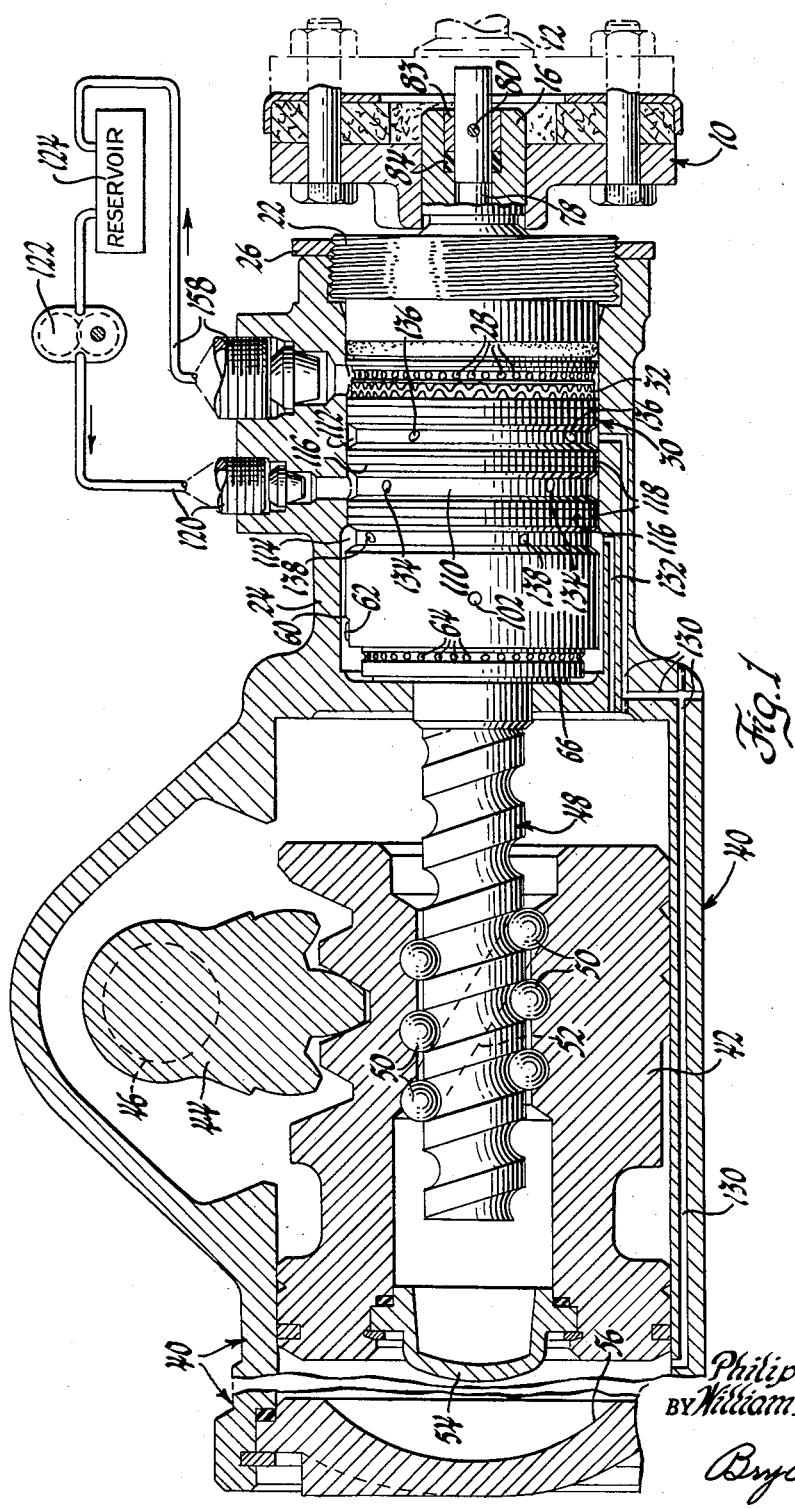
FIG. 1 is a side view of the gear, certain parts appearing in section, others in elevation and with certain auxiliary components represented diagrammatically.
Figure 2:
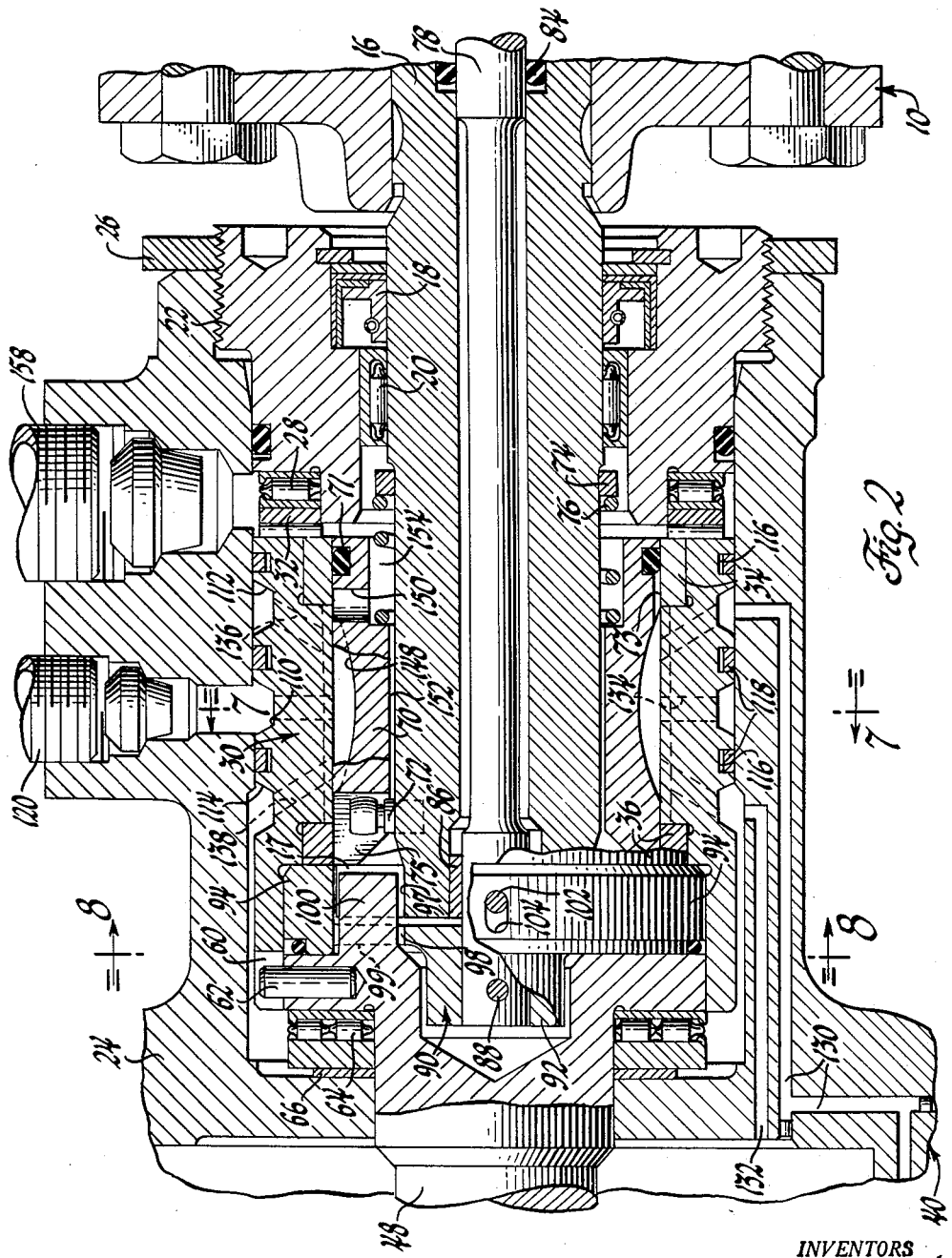
FIG. 2 is an enlarged fragmentary section showing the several parts of the control valve.
Figure 3:
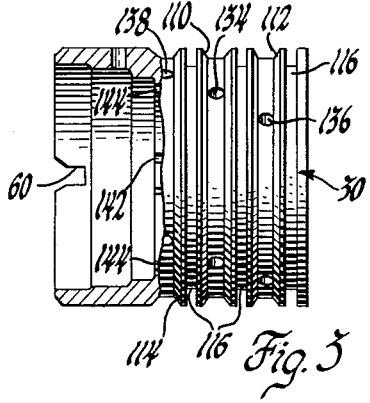
FIG. 3 is a detail of one of the control valve parts, the same being shown partly in section and partly in elevation.
Figure 4:
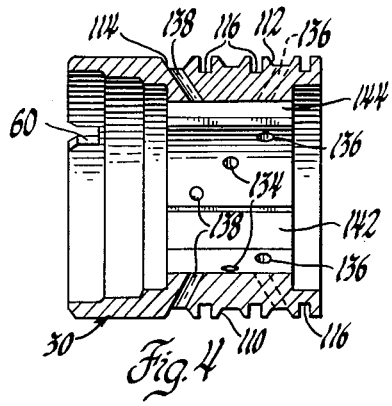
FIG. 4 is a section of such valve part, the section being taken as indicated by the line 4—4 in FIG. 7.

Referring now to FIGS. 1 and 2, the numeral 10 generally denotes a flexible coupling serving to interconnect the steering shaft 12, mounting the usual steering wheel, not shown, and a stub shaft 16 incorporated in the power steering assembly. Coupling 10 is described in U.S. Patent 2,753,848 to Robert W. Burton and, for that reason, need not be referred to here in any detail.

Figure 8:
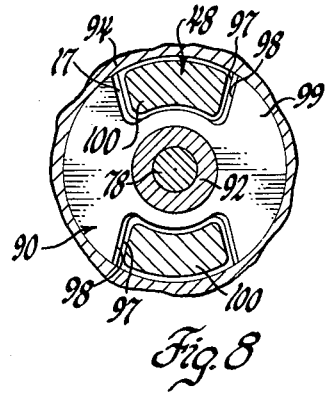
FIG. 8 is a view taken on the line 8—8 in FIG. 2, the parts shown appearing in reduced scale.

Stub shaft 16, which has a flanged inner end 17 (FIG. 8), is surrounded by a fluid seal at 18 (FIG. 2) and turns in needle bearings 20 inward of the seal. Both the seal and needle bearings are confined by an adjuster plug 22 threaded into the end of the housing 24 for the control valve component of the power steering apparatus. A lock nut 26 precludes loosening of the adjuster plug. At its inner end the plug is annularly recessed for the accommodation of thrust bearings 28, these bearings being functional with relation to an outer sleeve component 30 of the control valve. A spacer 32 will be seen disposed between the upper or righthand face of the sleeve 30 and the bearing race. At such end, sleeve 30 is internally annularly recessed to receive a ring element 34. A similar ring element 36 is accommodate in an annular recess at the opposite end of the sleeve. These ring elements serve to close off the ends of axial passages in the valve body, as will be subsequently understood.

A fluid motor or power cylinder 40 (FIG. 1) with which the valve housing 24 is shown integral, confines a piston 42 having rack teeth meshing with the teeth of a gear sector 44 fixed to or integral with a cross shaft 46. The latter connects with a pitman arm, not shown, through which the steering linkage is actuated.

Piston 42 is internally helically grooved in a manner complementary to the helical groove of a worm 48 received within the piston. Balls 50 constitute the connection between the piston and the worm. A return tube 52 allows for recirculation of the balls in a manner well understood in the art—see, for example, Hawkins U.S. Patent No. 2,267,524. As shown, the piston bore is closed at its left end by a cap piece 54. A somewhat similar cap piece 56 serves to close the left end of the cylinder 40.

Reverting to the outer sleeve component 30 of the control valve, it should be noted (FIG. 2) that the same at its left end is provided with a slot 60 accommodating a pin 62 staked in the flanged end of the worm 48. The worm flange will be seen as abutting a thrust bearing assembly 64 surrounding the body of the worm. A Belleville spring 66 coacts with the adjuster plug 22 to preload the bearings 28 and 64.

Within the outer sleeve component 30 of the control valve is confined a sleeve 70 having a slot 75 for the reception of a ball-head pin 72 carried by the previously mentioned stub shaft 16. Such shaft in its area surrounded by the bearing assembly 28 is formed to provide a shoulder for a snap ring 74 seating a spring 76 which, at its opposite end, seats against a shoulder provided by the inner sleeve 70.

Figure 5:
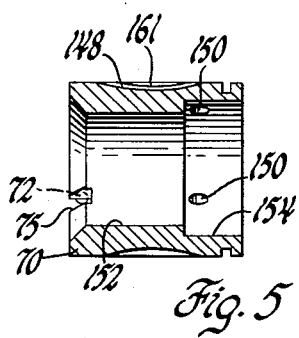
FIG. 5 is a section of another valve part, the section being taken as indicated by the line 5—5 in FIG. 7.
Figure 6:
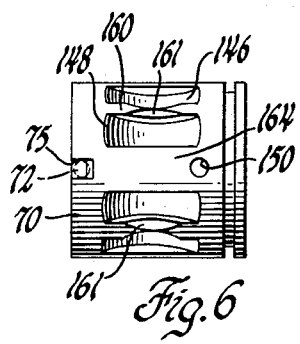
FIG. 6 is a plan of the latter valve part.

As shown in FIGS. 5 and 6, the walls of the slot 75 which engage the ball head pin 72 are tapered to facilitate the assembly operation. The pin serves to locate the sleeve 70 both axially and circumferentially. With the ball head design, the sleeve is permitted to "free float" within the outer sleeve 30 without binding on the pin. Spring 76 maintains the pin and slot connection while permitting the free floating.

Sleeve 70 at its right end will be seen carrying an O-ring 71 desirably formed of neoprene or other oil-resistant elastomer. This ring 71 is not installed as a seal but to damp vibrations of the sleeve, eliminating noise. Pressure fluid is supplied to the annular groove in which the ring 71 is accommodated through a notch 73 in sleeve 70. Such fluid operates to expand the ring, i.e., increase its dimension in the radial direction.

Stub shaft 16 has a central bore for the accommodation of a torsion rod 78 which is pinned to the stub shaft at 80 (FIG. 1) through a sleeve 83 confining a seal 84. At its end opposite the pin 80, torsion rod 78 is surrounded by an annular spacer 86 and is pinned at 88 to a connector 90 including a boss portion 92, a ring portion 94 and a web portion 99 interconnecting the boss and ring portions. This web portion is doubly apertured (98) to allow for the passage therethrough of tangs 100 integral with the flange of the worm 48 (see FIG. 8). These tangs are received with a slight clearance in slots 97 formed in the flanged end 17 of the stub shaft 16.

A pin 102 which is staked in the outer sleeve component 30 of the control valve will be seen accommodated (FIG. 2) in a slot 104 in the flange portion 94 of the connector 90.

On the foregoing it should be clear, considering the pin connections 80 and 72 on the one hand and the pin connections 88, 102 and 62 on the other, that whereas the right hand end of the torsion rod 78 and with it the inner valve sleeve 70 tends to move with the stub shaft 16, the left hand end of the torsion rod and with it the outer sleeve component 30 tends to move with the screw 48.

The general organization of the gear having been thus explained, reference will now be made to FIGS. 3–6 showing the control valve components in detail. From FIGS. 3 and 4 it will be seen that the outer sleeve component 30 comprises three annular grooves 110, 112 and 114, spaced by grooves 116 in which are seated seals 118 (FIGS. 1 and 2). These seals 118 serve to separate the passages provided by the annular grooves 110, 112 and 114. Groove 110 may be termed the "pressure" groove as the same is open to the discharge line 120 (FIG. 1) of the power steering pump 122 which draws fluid from a reservoir 124. Annular grooves 112 and 114 may be termed "power" grooves since these grooves are open via lines 130 and 132 respectively to the lower and upper ends of the power cylinder 40.

Each groove 110, 112 and 114 has therein a plurality of radial ports 134, 136 and 138 respectively. In the case of the particular embodiment, four radial ports in each groove are contemplated. From FIG. 7, it will be observed that radial ports 134 are drilled straight, while from FIG. 4, it will be seen that radial ports 136 and 138 are drilled diagonally so that their axes intersect.

Figure 7:
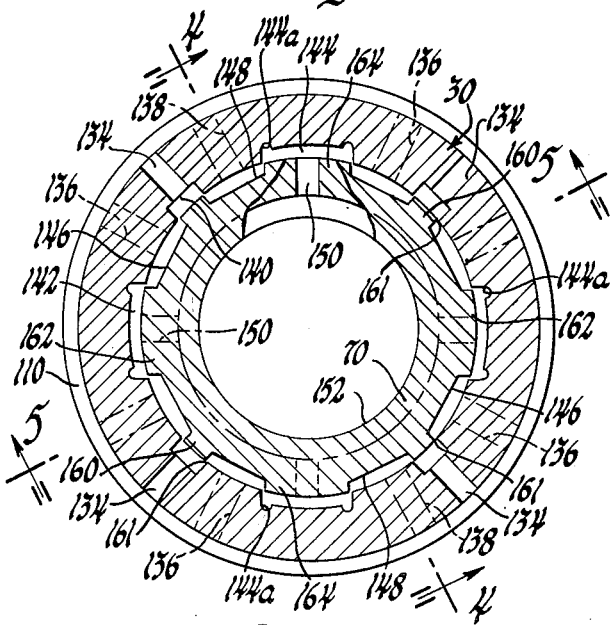
FIG. 7 is a view taken on the line 7—7 in FIG. 2.

In addition to the annular grooves and radial ports, the outer sleeve 30 comprises internal axial grooves 140, 142 and 144 (FIG. 7). Axial grooves 144 have therein slots or notches 144a, the purpose of which will later appear.

The inner sleeve component 70 has therein axial grooves 146 and 148 which are coactive with respect to axial grooves 140, 142 and 144 in the outer sleeve 30. As viewed in FIG. 5, the grooves 146 and 148 will be noted as arcuately shaped, this to the end of providing for fluid sealing at the ends of the sleeve 70.

Like the outer sleeve 30, sleeve 70 has therein a plurality of radial ports 150. These ports open to the bore 152 of the sleeve which in turn, as shown in FIG. 1, opens to a chamber 154 within which the spring 76 is housed.

Chamber 154 is open to an exhaust line 158 extending to the system reservoir 124.

The axial grooving of the sleeve 70 provides a plurality of lands 160, 162 and 164. Lands 162 and 164 contain the radial exhaust ports 150. The inner edges of lands 160, as these appear in FIG. 6, are chamfered for a reason whihc will be subsequently understood.

*Operation*

As indicated hereinbefore, the outer sleeve member 30 and the inner or left hand end of the torsion rod 78 are connected to the worm 48, that is to the load, while the upper or right hand end of the torsion rod and the inner valve component 70 are connected to the stub shaft 16, which represents the input to the steering gear. On rotation of the stub shaft 16 the torson rod 78 which is under no preload immediately begins to twist. Such twisting results in rotary movement of the inner sleeve 70 relative to the outer sleeve 30, the relative motion being permitted by the clearance between the worm tangs 100 and the walls of the slots in the stub shaft flange 17, causing energization of the motor 40, 42. The tang and slot connection between the stub shaft and the worm 48 constitutes a fail-safe device enabling manual steering of the vehicle in the event of hydraulic failure.

The torsion bar 78 tends to maintain the inner sleeve 70 in a normal centered position (FIG. 7) relative to the outer sleeve 30. Thus, when the manual turning effort imposed at the stub shaft 16 ceases the torsion bar immediately untwists, so to speak, rotating the stub shaft and restoring the inner sleeve to such normal position.

With the sleeve 70 centered in the sleeve 30, corresponding to the straight-ahead position of the dirigible wheels of the vehicle radial ports 134, whcih are disposed in the annular pressure groove 110, are open both to the radial ports 136 and 138 and the radial exhaust ports 150. Under this condition, the pressure fluid provided by the pump 122, which should be considered as in constant operation so long as the vehicle engine is running, freely circulates through the valve against the static pressure of the fluid in the power cylinder 40.

Assuming a right turn, for example, the clockwise rotation of the sleeve 70 (FIGURE 7), such rotation being induced by clockwise rotation of the stub shaft 16, will cause lands 160 to seal off radial ports 138 from radial ports 134 so that the flow of pressure fluid is limited to radial ports 136 which communicate via passage 130 with the lower end of power cylinder 40. Simultaneously, lands 162 close off radial ports 136 to the related exhaust ports 150, and, in consequence, a pressure differential is created across the piston 42 in favor of the lower or left-hand chamber of the power cylinder and the desired fluid assist given to the piston 42. The latter through the gear sector 44 imparts counterclockwise rotation to the pitman arm cross shaft 46 (FIGURE 1). With the sleeve 70 in its rotated position (clockwise) radial ports 138 are fully open to the corresponding radial exhaust ports 150 through axial grooves or channels 144, so that the upper or right-hand chamber of the power cylinder is free to exhaust. Slots 144a by creating a turbulent flow in grooves 144 reduces the annoying hissing noise heretofore experienced in the operation of power steering control valves and deriving from the return channels in such valves.

On a left-turn the action, of course, is just the opposite, the radial exhaust ports 150 functional with relation to the ports 138 being closed off while ports 136 remain open to the exhaust line.

The outer sleeve 30 being connected to the worm 48 to rotate therewith seeks constantly to catch up, so to speak, with the inner sleeve. On cessation of the effort at the steering wheel, the sleeves 30 and 70 immediately become centered by force of the torsion bar 78. This is accompanied by reversal of the steering parts, induced, as in conventional, by the geometry of the steering linkage (not shown). It will be understood that the axial movement of the power piston 42 occurring on such reversal causes rotation of the worm 48 and that the rotation of the worm is accompanied by rotation of the outer sleeve member 30.

The degree of twisting or deflection of the torsion rod 78 as the steering action proceeds is determined by the load (steering resistance) and is essentially a straight line function. Thus, substantially twice as much effort is required at the steering wheel to twist the rod two degrees as must be imposed to twist it one degree. The actual rate of the rod, of course, is set by control of the diameter and/or length thereof. In a preferred form of the invention, a rate of the order of 9 inch-pounds per degree of deflection obtains.

Referring now to the matter of the chamfering 161 of the lands 160 carried by the inner sleeve component 70 of the rotary control valve, it should be clear on reflection that in the absence of such chamfers, once the valving edge of the land cleared the edge of the corresponding port, the pressure build-up in the fluid motor would be substantially instantaneous regardless of the steering resistance. Such a condition would not be desirable because there would be no proportionality of "feel" at the steering wheel; i.e., the "feel" at the steering wheel would bear no relation to the actual steering resistance.

By means of the chamfering, a "wire drawing" effect is created with the result that the opening and closing of the pressure ports 134 is smooth and progressive. In the case of the above-mentioned preferred embodiment of the invention, the pressure build-up occurs through a 1°–3° deflection of the torson rod. Thus, during parking or maneuvering of the vehicle in close quarters when maximum pressure is required to energize the fluid motor, the effort required at the steering wheel to maintain the inner sleeve component of the valve displaced is substantially three times that required to hold the sleeve displaced where the steering resistance is slight as, for example, when the vehicle is being driven over a highway at normal cruising speeds. In this way the operator is provided with proportional "feel" as desired.

In lieu of the chamfering, the wire drawing effect can, of course, be obtained by suitably formed notches, for instance, appropriately spaced about the valving edge of the lands controlling the inlet or pressure ports. Lands 162 and 164 controlling the exhaust porting may also be chamfered or provided with notches, for example, if considered desirable.

What is claimed is:

1. In a servo valve, a housing having therein an inlet port and an outlet port together with a power passage, an outer sleeve member within said housing comprising a pair of annular grooves about the periphery thereof with sealing means located in an annular recess between said grooves, one of said grooves being a pressure groove open to said inlet port, the other of said grooves being open to said power passage, said sleeve member further comprising a pair of spaced internal axial grooves and first and second radial ports, said first radial port communicating one of said internal axial grooves and said pressure groove, said second radial port being located mediate said internal axial grooves and being open to the said other of said annular grooves, and an inner sleeve member within said outer sleeve member having an external axial groove through which said first and second radial ports are communicable and further having a radial exhaust port circumferentially spaced from said external axial groove and communicating with said outlet port, said sleeve members being relatively rotatable to substantially fully open said second radial port to said first radial port and to substantially block communication between said first radial port and said radial exhaust port.

2. A servo valve as defined by claim 1 including yieldable means operably associated with said sleeve members and tending to resist relative rotation thereof.

3. In a servo valve, a housing having therein an inlet port and an outlet port together with a pair of power passages, an outer sleeve member within said housing comprising three spaced annular grooves about the periphery thereof with sealing means between said grooves, one of said annular grooves being open to said inlet port, the other two of said annular grooves each being open to one of said power passages and being located one at either side of said one annular groove, said outer sleeve member further comprising three internal axial grooves forming a pair of lands located one at either side of the central of said internal axial grooves and first, second, third and fourth radial ports, said first and second radial ports opening to the internal axial grooves spaced from said central internal axial groove by said lands and communicating such internal axial grooves and the said one of said annular grooves, said third and fourth radial ports extending through said lands with each being open to one of the said other two annular grooves, and an inner sleeve member within said outer sleeve member having therein a pair of external axial grooves together with a radial exhaust port located between said external axial grooves and open to said outlet port, said inner sleeve member having a normal position relative to said outer sleeve member whereat said external axial grooves are in circumferential juxta-position to said lands, said sleeve members being relatively rotatable in either direction to substantially fully open one of said first and second radial ports to that one of said third and fourth radial ports which is adjacent thereto, said radial exhaust port on such rotation becoming substantially fully closed to the said one of said first and second radial ports and to the said one of said third and fourth radial ports.

4. A servo valve as defined by claim 3 including a torsion bar connected to said sleeve members and tending to resist relative rotation thereof.

5. In a servo system, an input member, a source of fluid pressure, a fluid motor including a housing having an output member extending therefrom, a valve for said motor having a housing portion including inlet and outlet ports connected to said pressure source and a power passage to said motor, said valve incorporating an outer sleeve member within said housing having connection with said output member and comprising a pair of annular grooves about the periphery thereof with sealing means between said grooves, one of said grooves being open to said inlet port, the other being open to said power passage, said sleeve member further comprising a pair of spaced internal axial grooves and first and second radial ports, said first radial port communicating one of said internal axial grooves and said one of said annular grooves, said second radial port being located mediate said internal axial grooves and being open to the said other of said annular grooves, an inner sleeve member within said outer sleeve member having connection with said input member and having an external axial groove through which said first and second radial ports are communicable, said inner sleeve member including a radial exhaust port circumferentially spaced from said external axial groove and communicating with said outlet port, said sleeve members being relatively rotatable to substantially fully open said second radial port to said first radial port and to substantially block communication between said first radial port and said radial exhaust port, and yieldable means operably associated with said sleeve members and tending to resist relative rotation thereof.

6. In a servo system, an input member, an output member, a source of fluid pressure, a fluid motor including a housing confining a piston operably connected to said output member, a valve for said motor having a housing portion including inlet and outlet ports connected to said pressure source and a pair of power passages to said motor, said valve incorporating an outer sleeve member within said valve housing having connection with said output member and comprising three spaced annular grooves about its periphery with sealing means located in annular recesses between said grooves, one of said anular grooves being open to said inlet port, the other two of said annular grooves each being open to one of said power passages and being located one at either side of said one annular groove, said outer sleeve member further comprising three internal axial grooves forming a pair of lands located one at either side of the central of said internal axial grooves and first, second, third and fourth radial ports, said first and second radial ports opening to the internal axial grooves spaced from said central internal axial groove by said lands and communicating such internal axial grooves and the said one of said annular grooves, said third and fourth radial ports extending through said lands with each being open to one of the said other two annular grooves, an inner sleeve member within said outer sleeve member connected to said input member and having therein a pair of external axial grooves together with a radial exhaust port located between said external axial grooves and open to said outlet port, said inner sleeve member having a normal position relative to said outer sleeve member whereat said external axial grooves are in circumferential juxta-position to said lands, said sleeve members being relatively rotatable in either direction to substantially fully open one of said first and second radial ports to that one of said third and fourth radial ports which is adjacent thereto, said radial exhaust port on such rotation becoming substantially fully closed to the said one of said first and second radial ports and to the said one of said third and fourth radial ports, and a torsion bar connected to said sleeve members and tending to maintain said inner sleeve member in its said normal position.

7. In a servo system, an input member, an output member, a source of fluid pressure, a fluid motor including a housing confining a piston racked to said output member, a valve for said motor having a housing portion in substantial coaxial alignment with said motor housing including inlet and outlet ports connected to said pressure source and a pair of power passages to said motor, said valve comprising an outer sleeve member within said valve housing operably connected to said piston through screw means and an inner sleeve member connected to said input member and to said outer sleeve member, the latter connection being effected through a torsion bar tending to maintain said inner sleeve member in a normal centered relation with respect to said outer sleeve member, the latter comprising three spaced annular grooves about the periphery thereof with sealing means between said grooves, one of said annular grooves being open to said inlet port, the other two of said annular grooves each being open to one of said power passages and being located one at either side of said one annular groove, said outer sleeve member further comprising three internal axial grooves forming a pair of lands located one at either side of the central of said internal axial grooves and first, second, third and fourth radial ports, said first and second radial ports opening to the internal axial grooves spaced from said central internal axial groove by said lands and communicating such internal axial grooves and the said one of said annular grooves, said third and fourth radial ports extending through said lands with each being open to one of the said other two annular grooves, and an inner sleeve member within said outer sleeve member having therein a pair of external axial grooves together with a radial exhaust port located between said external axial grooves and open to said outlet port, said inner sleeve member having a normal position relative to said outer sleeve member whereat said external axial grooves are in circumferential juxta-position to said lands, said sleeve members being relatively rotatable in either direction against the resistance of said torsion bar to substantially fully open one of said first and second radial ports to that one of said third and fourth radial ports which is adjacent thereto, said radial exhaust port on such rotation becoming substantially fully closed to the said one of said first and second radial ports and to the said one of said third and fourth radial ports.

8. A valve comprising a first sleeve member adapted for connection to the output of a servo mechanism, a second sleeve member received telescopically by said first member and carrying a chamfered land controlling a port in said first member, said second sleeve member being adapted for connection to the input of the servo mechanism, and a torsion rod connected to said members and presenting a resistance to relative rotary movement thereof.

9. A fluid power steering gear including a power cylinder having a pair of pressure chambers delineated by a piston within the cylinder, a valve controlling fluid flow to and from said chambers comprising a housing having inlet and exhaust ports therein and confining telescopically arranged, ported sleeve members the inner of which is rotatable within predetermined limits relative to the outer and carries a land functional with relation to a port in the outer sleeve member communicating with said inlet port, said land having a chamfered valving edge, screw means through which the said outer sleeve member is connected to said piston, manually actuable means operably connected to said inner sleeve member, and a torsion rod connected to said manually actuable means and to said piston through said screw means, said torsion rod being deflected incident to the relative rotary movement of said inner sleeve member.

10. A servo valve comprising a casing having inlet and exhaust ports therein, an outer sleeve member within said casing, an inner sleeve member rotatable within said outer member, said inner sleeve member carrying first and second lands extending axially thereof and a third such land disposed between said first and second lands, said first and second lands having radial ports therein communicating with said exhaust port, said outer sleeve member having therein a radial pressure port and a first internal axial groove to which said pressure port opens, said pressure port being controlled by said third land, said outer sleeve member further having therein second and third internal axial grooves normally in registry with said first and second lands and a radial power port at either side of said first internal axial groove, each of said second and third axial grooves being in communication with the radial port in the land with which it normally registers and comprising notches serving to induce turbulence in the fluid flow through such port.

11. A fluid power steering gear comprising a source of fluid pressure, a fluid motor adapted for operative connection to a steering member, a valve controlling fluid flow between said pressure source and said motor, said valve including a pair of telescopically related ported sleeve members the inner of which is rotatable relative to the outer, said inner member having a tapered slot at one end thereof, a manually actuated stub shaft for effecting such relative rotation, said stub shaft being restrained against axial movement and carrying a ball-headed pin accommodated to said tapered slot, and a spring encircling said stub shaft and reacting thereagainst for maintaining said inner sleeve member in proper engagement with said pin.

12. A fluid power steering gear comprising a source of fluid pressure, a fluid motor adapted for operative connection to a steering member, and a valve for controlling fluid flow between said pressure source and said motor, said valve including a pair of telescopically related ported sleeve members the inner of which is rotatable relative to the outer, said inner member carrying a ring formed of an elastomeric material and accommodated in an annular groove in said inner member, said groove in the operation of the valve being in communication with said source whereby said ring is radially expanded to prevent vibrations of said inner sleeve member manifested as noise.

References Cited in the file of this patent

UNITED STATES PATENTS

| | | |
|---|---|---|
| 1,479,544 | Johnson | Jan. 1, 1924 |
| 1,947,973 | Davis | Feb. 20, 1934 |
| 2,605,854 | MacDuff | Aug. 5, 1952 |
| 2,640,322 | Puerner | June 2, 1953 |
| 2,688,258 | Haynes et al. | Sept. 7, 1954 |
| 2,740,383 | Hallberg et al. | Apr. 3, 1956 |
| 2,770,098 | Korkowski et al. | Nov. 13, 1956 |
| 2,824,550 | Gribler et al. | Feb. 25, 1958 |